US010456793B2

(12) United States Patent
Nikles

(10) Patent No.: US 10,456,793 B2
(45) Date of Patent: Oct. 29, 2019

(54) CARTRIDGES AND DISPENSER DEVICES FOR JETS OF WATER INCORPORATING SUCH CARTRIDGES

(71) Applicant: NIKLES TEC ITALIA S.r.l., Carpenedolo, Brescia (IT)

(72) Inventor: Gerhard Nikles, Brescia (IT)

(73) Assignee: NIKLES TEC ITALIA S.r.l., Carpenedolo, Brescia (IT)

( * ) Notice: Subject to any disclaimer, the term of this patent is extended or adjusted under 35 U.S.C. 154(b) by 329 days.

(21) Appl. No.: 14/600,019

(22) Filed: Jan. 20, 2015

(65) Prior Publication Data

US 2015/0202637 A1 Jul. 23, 2015

(30) Foreign Application Priority Data

Jan. 20, 2014 (IT) ............................... BS2014A0022
Jul. 10, 2014 (IT) ............................... BS2014A0122

(51) Int. Cl.
*B05B 1/18* (2006.01)
*E03C 1/04* (2006.01)
(Continued)

(52) U.S. Cl.
CPC ............... *B05B 1/185* (2013.01); *B05B 1/18* (2013.01); *B05B 15/00* (2013.01); *E03C 1/0408* (2013.01);
(Continued)

(58) Field of Classification Search
CPC .......... B05B 1/185; B05B 1/18; B05B 15/00; E03C 1/0408; F03B 13/10; F21V 33/004; H04R 1/021; H04R 1/028; F21Y 2115/10
(Continued)

(56) References Cited

U.S. PATENT DOCUMENTS 5,140,254 A * 8/1992 Katzman ................. A47K 3/281
290/54
6,036,333 A * 3/2000 Spiller .................... F03B 13/00
290/43
(Continued)

FOREIGN PATENT DOCUMENTS

CN 101590455 A 12/2009
EP 2158972 A1 3/2010
(Continued)

*Primary Examiner* — Steven J Ganey
(74) *Attorney, Agent, or Firm* — Arent Fox LLP; Michael Fainberg

(57) ABSTRACT

Cartridges are provided for use in dispenser devices of jets of water. Dispenser devices incorporating such cartridges are also provided. Cartridges may include a cartridge body having a first compartment and a second compartment, said second compartment being separated from the first compartment by a watertight separation septum, in the cartridge body an entry aperture being made for the entry of a flow of water into the first compartment and at least one exit aperture opening towards the outside for the exit of the flow of water from the first compartment. A current generator may be housed in said first compartment, said generator being suitable for being driven by a flow of water which crosses said first compartment from the entry aperture to the at least one exit aperture. A light source, a loudspeaker or other electronic device may be housed in said second compartment and powered electrically by the generator.

22 Claims, 7 Drawing Sheets

(51) Int. Cl.
*F21V 33/00* (2006.01)
*B05B 15/00* (2018.01)
*F03B 13/10* (2006.01)
*H04R 1/02* (2006.01)
*F21Y 115/10* (2016.01)

(52) U.S. Cl.
CPC ............ *F03B 13/10* (2013.01); *F21V 33/004* (2013.01); *H04R 1/021* (2013.01); *F21Y 2115/10* (2016.08); *H04R 1/028* (2013.01)

(58) Field of Classification Search
USPC ............. 239/548, 18, 525, 530, 289; 362/96
See application file for complete search history.

(56) References Cited

U.S. PATENT DOCUMENTS

| | | | | |
|---|---|---|---|---|
| 7,841,732 B2* | 11/2010 | Coushaine | .............. | F03B 13/00 362/192 |
| 8,686,586 B1* | 4/2014 | Tsai | ........................ | F21S 9/046 290/54 |
| 2004/0078891 A1* | 4/2004 | Yip | ........................... | B05B 1/18 4/615 |
| 2008/0271238 A1* | 11/2008 | Reeder | ..................... | A46B 7/04 4/597 |
| 2008/0315015 A1 | 12/2008 | Hu | | |
| 2011/0068192 A1* | 3/2011 | Klicpera | ............... | B05B 12/004 239/74 |
| 2011/0220735 A1 | 9/2011 | Li | | |
| 2012/0170424 A1 | 7/2012 | Zhou et al. | | |
| 2013/0062437 A1* | 3/2013 | Hanna | ...................... | B05B 1/18 239/289 |
| 2013/0333764 A1* | 12/2013 | Wright | ..................... | E03C 1/02 137/1 |
| 2014/0268650 A1 | 9/2014 | Tsai | | |

FOREIGN PATENT DOCUMENTS

| | | |
|---|---|---|
| EP | 2218512 A1 | 8/2010 |
| JP | 2005113437 A | 4/2005 |
| JP | 3168285 U | 6/2011 |
| WO | 2011148399 A1 | 12/2011 |

* cited by examiner

CARTRIDGES AND DISPENSER DEVICES FOR JETS OF WATER INCORPORATING SUCH CARTRIDGES

CROSS REFERENCE TO RELATED APPLICATION

This application claims priority to and benefit of Italian Patent Application No. BS2014A000022 filed Jan. 20, 2014 and to Italian Patent Application No. BS2014A000122 filed Jul. 10, 2014, the contents of which are incorporated by reference in their entirety.

FIELD OF THE INVENTION

The present invention relates to a cartridges associated with devices for dispensing jets of water, such as a shower head, a hand-held shower, dispensers for a washbasin and the like and suitable for generating sound, light, olfactory or other effects perceivable by a user. The invention also relates to dispenser devices for jets of water incorporating such cartridges.

In the description below, such effects produced by the cartridges also will be referred to as a "secondary effect" to distinguish it from the primary effect of dispensing a jet of water.

BACKGROUND OF THE INVENTION

Devices for dispensing a jet of water, in particular shower heads and taps provided with light sources suitable for emitting a light effect during the dispensing of a jet of water are already known. In common devices, light sources, for example of the LED-type, are powered by an electric battery, also housed in the body of the dispenser device.

In addition, devices for dispensing a jet of water particularly shower heads, fitted with a loudspeaker to listen to music while showering, are already known. In common devices, the loudspeaker is powered by an electric battery, also housed in the body of the dispenser device. Examples of these devices are described in WO2013/036631 and EP1686770A1.

One drawback of the power supply provided by an electric battery is that its replacement or recharging, when it is flat, is far from easy, in particular in the case of a shower head, given its positioning at a certain height from the ground.

The document U.S. Pat. No. 5,140,254 describes a shower head with a speaker and a turbine generator capable of generating the electricity necessary for operating the speaker when a flow of water strikes such generator. Such technical solution makes it possible to resolve the problem of replacing or recharging the batteries. However, the structure, shape and dimensions of such a device are heavily influenced by the presence of the turbine generator, so that such device has not met with much commercial success.

Dispenser devices of a jet of water are also known which are provided with light sources powered by a main power grid through a power cable. Such embodiment solves the problem of replacing or recharging the batteries, but complicates the structure and installation of the dispenser device because it requires the provision of a water-tight space for the passage of electrical cables and its connection elements. Moreover, in case of failure of the electrical equipment it is hard to pinpoint where the failure occurred and thus complicates repair.

SUMMARY OF THE INVENTION

The present invention provides dispenser devices for jets of water, provided with at least one electronic device suitable for generating a secondary effect perceivable by a user and powered by a generator powered by the flow of water, but wherein such devices have a structure, shape and dimensions comparable to those of battery-powered devices.

Dispensers according to the present invention are achieved by use of cartridges and dispensers as described and claimed herein. The dependent claims describe preferred further embodiments of the invention.

Such cartridges may include a cartridge body defining a first compartment and a second compartment. The second compartment may be separated from the first compartment by a watertight separation septum. An entry aperture may be made in the cartridge body, for the entry of a flow of water inside the first compartment, and at least one exit aperture opens outward the outside environment for the output of the water from the first compartment. A current generator may be housed in the first compartment and may be suitable for being driven by a flow of water which crosses said first compartment from the entry aperture to the at least one exit aperture. At least one electronic device suitable for generating a secondary effect perceivable by a user, such as a lighting effect, a sound effect, an olfactory effect, a massaging effect, an effect of the treating the user with ultraviolet light, may be housed in the second compartment and may be electrically powered by the generator. The second compartment may be separated from the external environment by a separation element, such as an optical element or a perforated plate, suitable for allowing the transmission to the outside of said secondary effect.

In certain embodiments, the cartridge body has a parallelepiped shape, preferably cylindrical, the first compartment being superposed to the second compartment along an axis of the cartridge.

In certain embodiments, the at least one exit aperture of the water is directed radially with respect to said cartridge axis. In this way, the jet of water in output from the first compartment is channeled towards the outside of the cartridge and does not penetrate inside the second compartment, thereby avoiding coming into contact with the electronic device.

In certain embodiments, around the side wall of the cartridge body, between the entry aperture and the at least one exit aperture of the water, a first seat is made in which a first external sealing element is housed suitable for acting in conjunction with a wall of a cartridge seat made in the dispenser device of the jet of water. In this way, all the water entering the dispenser device is channeled inside the first compartment of the cartridge activating the turbine generator.

In certain embodiments, around the side wall of the cartridge body, near the lower end of said body, a second seat is made in which a second external sealing element is housed suitable for acting in conjunction with a dispenser plate of the dispenser device of the jet of water. In this way, all the water which comes out of the exit apertures of the cartridge is distributed over the dispenser plate.

In certain embodiments, in the bottom side of the separation element a plurality of apertures are made suitable for being engaged by the teeth of a spanner to screw/unscrew the cartridge to/from a dispenser device of the jet of water. In this way, the cartridge can be easily and quickly fitted on and removed from the dispenser device.

Dispenser devices of jets of water according to the invention may include a hydraulic connection element to a water supply pipe, a device body, and a dispenser chamber of the jet of water fluidically connected to said hydraulic connection element and provided with at least one dispenser nozzle. In the device body a cartridge seat may communicate with the hydraulic connection element and with the dispenser chamber, and may be suitable for receiving cartridges as described above.

In certain embodiments, the cartridge seat may include a tubular casing which extends inside the device body from the distribution chamber to the hydraulic connection element; the distribution chamber may be delimited underneath by a dispenser plate crossed by a plurality of dispenser nozzles. In the dispenser plate at the cartridge seat, an aperture may be present which is engageable by the lower part of the cartridge. In this way, the cartridge can be completely contained within the body of the dispenser device. The separation element which forms the bottom surface of the cartridge may be advantageously substantially aligned with the dispenser plate, or even recessed in relation thereto.

In certain embodiments, when the cartridge is housed in the cartridge seat, downstream of the exit apertures, the dispenser sealingly engages the cartridge body, so that all the water which comes out of the exit apertures of the cartridge enters the distribution chamber to be ejected by the dispenser nozzles.

Further characteristics and advantages of cartridges and dispenser devices for water incorporating said cartridges will be evident from the detailed description below, made by way of a non-limiting examples and with reference to the drawings briefly described below.

BRIEF DESCRIPTION OF THE FIGURES

FIGS. 1 and 1a are perspective views, from above and below, respectively, of a cartridge according to the invention, in a first embodiment suitable for creating lighting effects;

FIG. 2 is a cross-section of the cartridge shown in FIGS. 1 and 1a;

FIGS. 3 and 3a are perspective views, from below and from above, respectively, of a cartridge according to another embodiment, suitable for generating acoustic effects;

FIG. 4 is a cross-section of the cartridge shown in FIGS. 3 and 3a;

DETAILED DESCRIPTION

Figure 1:
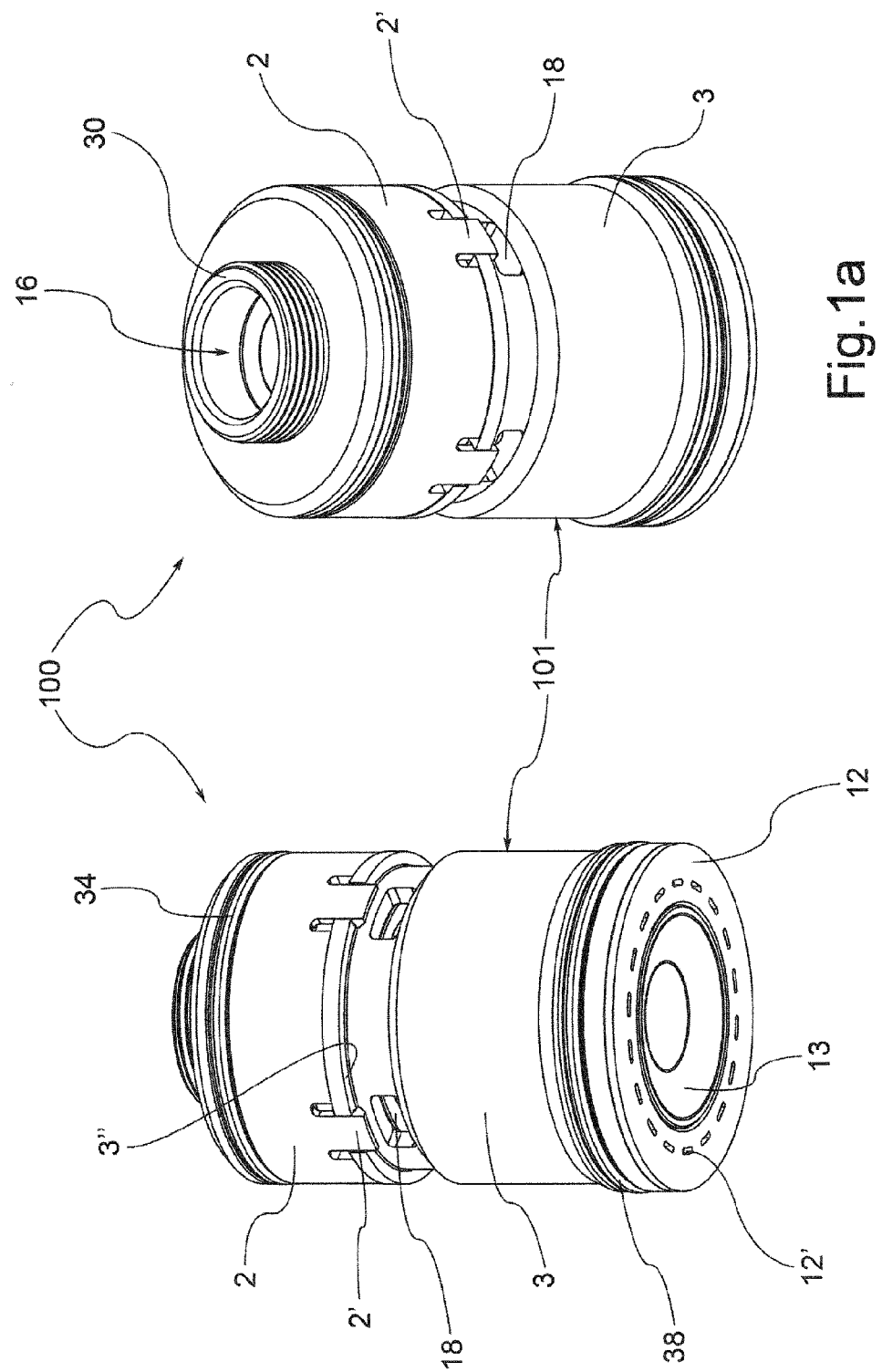

In said drawings, reference numerals 100 and 1000 globally denote a cartridge according to the invention in two embodiments. In a first embodiment, the cartridge 100 is suitable for generating lighting effects; in a second embodiment, the cartridge 1000 is suitable for generating sound effects, and can be a loudspeaker cartridge. As will be described below, apart from the different electronic device which they contain, the two cartridges may be identical to each other and thus perfectly interchangeable. The elements common to two exemplary embodiments of the cartridge will be indicated using the same reference numerals.

As further illustrated below, the cartridge is suitable for being inserted in the body of a dispenser device of a jet of water.

In the remainder of the description, the terms "upper" and "lower" refer to the cartridge vertically-oriented, as in the drawings, and correspondingly to its preferred configuration of use in a body of a shower head, with the electronic device pointing downwards so as to emit the light or acoustic effect substantially in the same direction as the jet of water.

Figure 2:
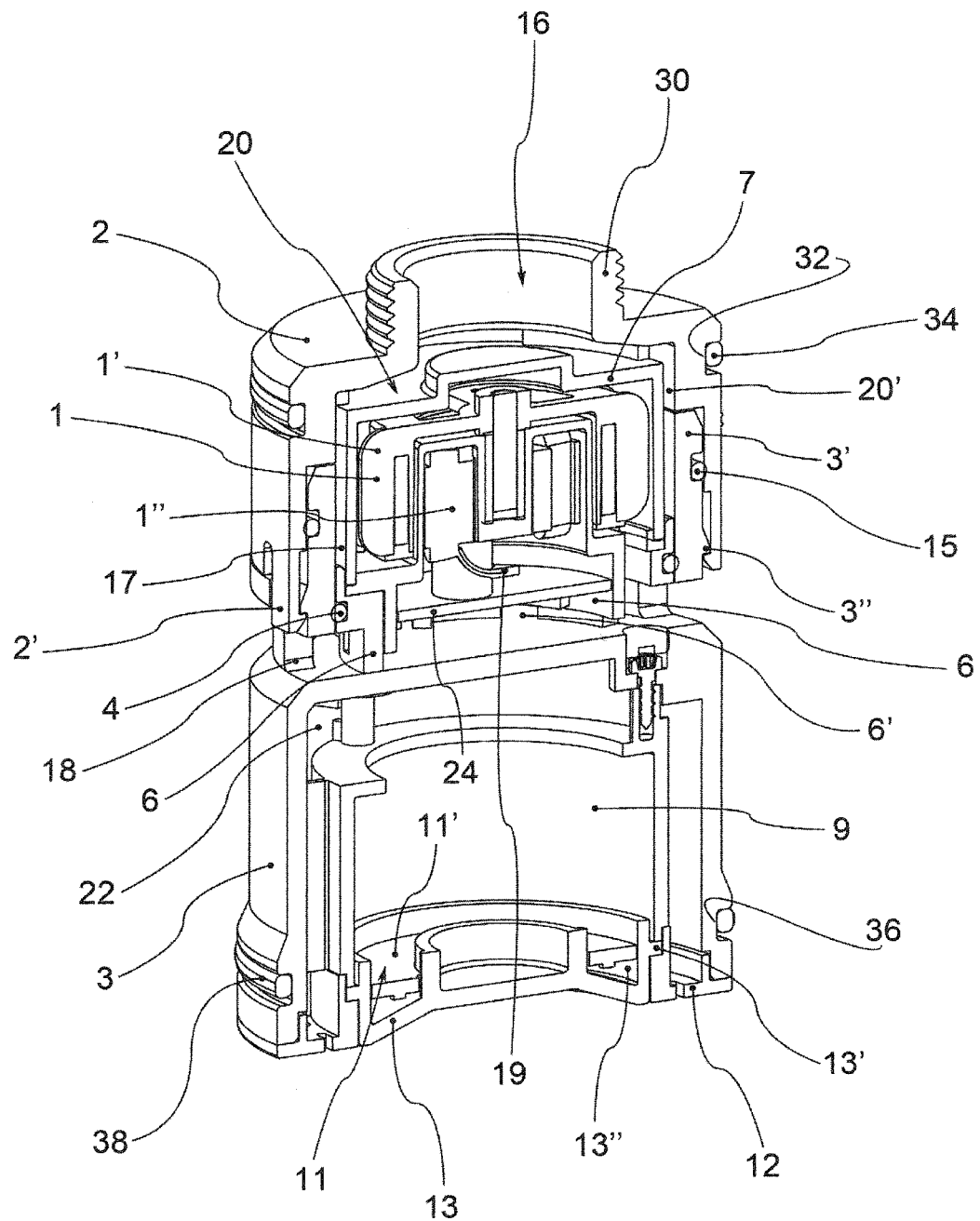

FIGS. 1, 1a and 2 show a cartridge 100 fitted with a light source. In the remainder of the description the term "light source" will be used to refer to both a single source of light and a plurality of point light sources, for example of the LED-type, activated simultaneously, individually or in blocks according to a suitable control programme to generate one or more desired lighting effects.

The cartridge 100 may include a cartridge body 101 defining a first compartment 20 and a second compartment 22. The second compartment 22 may be separated from said first compartment 20 by a waterproof separating septum 24. In the cartridge body 101 an aperture 16 for the entry of a flow of water into the first compartment 20 and at least one exit aperture 18 opening outward for the exit of the flow of water from the first compartment 20 may be present. For example, the entry aperture 16 may be present in the top end of the cartridge body 101, while a plurality of exit apertures 18 may be present in an intermediate portion of the cartridge body 101.

In the first compartment 20 a current generator 1 may be housed which may be activated by a flow of water which crosses said first compartment 20 from the entry aperture 16 to the exit apertures 18. For example, said current generator 1 may be a turbine generator. The flow of water entering the first compartment 20 may activate the blades 1' of the turbine which command a dynamo 1" which generates electricity.

The light source 11 may be housed in the second compartment 22. In certain embodiments, said light source 11 may include a plurality of LED point sources mounted on a circuit board 11'. The light source 11 may be powered by the generator 1. The second compartment 22 may be closed at the bottom by an optical element 13, for example of a truncated cone shape to permit the emission of a light beam emitted by the light source 11.

In certain embodiments, the cartridge body 101 has a parallelepiped shape, which is substantially cylindrical. The first compartment 20 may be superposed on the second compartment 22 along a cartridge axis X. The entry aperture 16 and the optical element 13 may be present at opposite ends of the cartridge body 101. The exit apertures 18 may be in the form of radial slits, distributed around said cartridge axis X, for example at an intermediate height between the opposite ends of the cartridge body 101 along the cartridge axis X.

In certain embodiments, the current generator 1 may be inserted in a generator casing 7. Said generator casing 7 may be contained in water-tight housing in the first compartment 20. Between the walls of the first compartment 20 and the outer walls of the generator casing 7 an entry chamber 20' may be thus defined, for example of an annular shape. In said generator casing 7 entry passages 17 for the flow of water coming from the entry aperture 16 and exit passages in fluidic communication with the exit apertures 18 may be present.

In one embodiment, in which the rotation axis of the turbine 1' is coaxial with the cartridge axis X, said entry passages 17 may be present in the side wall of the generator casing 7 and may be configured as vertical or inclined slits suitable for forcing the flow of water present in the entry chamber 20 inside the generator casing 7 in the tangential direction in relation to the turbine blades 1'.

In one embodiment, the generator casing 7 rests on an annular base 6, for example, resting directly on the separation septum 24. In said annular base 6 exit channels 6' may be present which place the exit passages in fluidic communication with the exit apertures 18.

Turning now to the portion of the cartridge relative to the light source, in certain embodiments an optical support element 9, preferably of a cylindrical shape, attached for example by means of screws 8 hidden by respective caps 8', to the cartridge body 101, preferably at the separation septum 24 may be housed in the second compartment 22. A bottom cover 12 of an annular shape may be connected, for example by means of screws, to said optical support element 9. The optical element 13, in one embodiment comprising a transparent disc, may occupy the axial aperture delimited by the bottom cover 12. In another embodiment, said optical element 13 may be provided with a radial bracket 13' held between the optical support element 9 and the bottom cover 12.

In certain embodiments, the optical element 13 delimits a circuit board seat 13" in which the circuit board 11' is housed In certain embodiments, in the lower side of the bottom cover 12 a plurality of apertures 12' may be present, for example distributed along a circumference, in which they engage the teeth 52 of a spanner 50 to screw/unscrew the cartridge 100 to/from the dispenser device of the jet of water, as will be described below.

In one embodiment, the light source 11 may be powered by the generator by means of an electric cable 19.

In another embodiment, in the second compartment 22 a back-up battery—not shown—also may be housed for the power supply of the light source 11. The back-up battery may be mounted on the circuit board 11'. The back-up battery may be suitable for powering the light source 11 even when the flow of water is interrupted for a predetermined period of time.

In another embodiment, the circuit board 11' may be connected to a temperature sensor—not shown—suitable for detecting the temperature of the water dispensed so as to command point light sources to emit beams of light with a colour dependent on the temperature of the water.

In certain embodiments, the entry aperture 16 of the water may be made in a threaded neck 30 for the connection of the cartridge 100 to a dispenser device of a jet of water, as described below.

In the side wall of the cartridge body 101, between the upper end of the body containing the entry aperture 16 and the exit apertures 18, a first seat 32 may be present which houses a first external sealing element 34, for example an O-ring, suitable for acting in conjunction with a wall of a cartridge seat made in the dispenser device of the jet of water, as described below.

Furthermore, in the side wall of the cartridge body 101, near the lower end of the cartridge, a second seat 36 may be present which houses a second external sealing element 38, for example an O-ring, suitable for acting in conjunction with the dispenser plate of the dispenser device of the jet of water, as described below.

In certain embodiments, the cartridge body 101 may be made in two parts sealingly coupled to each other. For example, the body may be made of a lower shell 3 which forms the second compartment 22, the separation septum and an intermediate portion in which the exit apertures 18 are present. Said lower shell 3 may terminate at the top with a tubular end portion 3' which forms part of the first compartment 20 and which has an outer surface configured to couple with an upper shell 2, which delimits the top of the first compartment 20. For example, in the side wall of the tubular end portion 3' an undercut 3" may be present suitable for being engaged through a snap coupling mechanism, by elastic teeth 2' present in the side wall of the upper shell 2.

Between the lower 2 and upper shells 3 a sealing element 15, e.g. an O-ring may be interposed. Between the annular base 6 and the tubular end portion 3' an additional sealing element 4 may be interposed.

Figure 3:
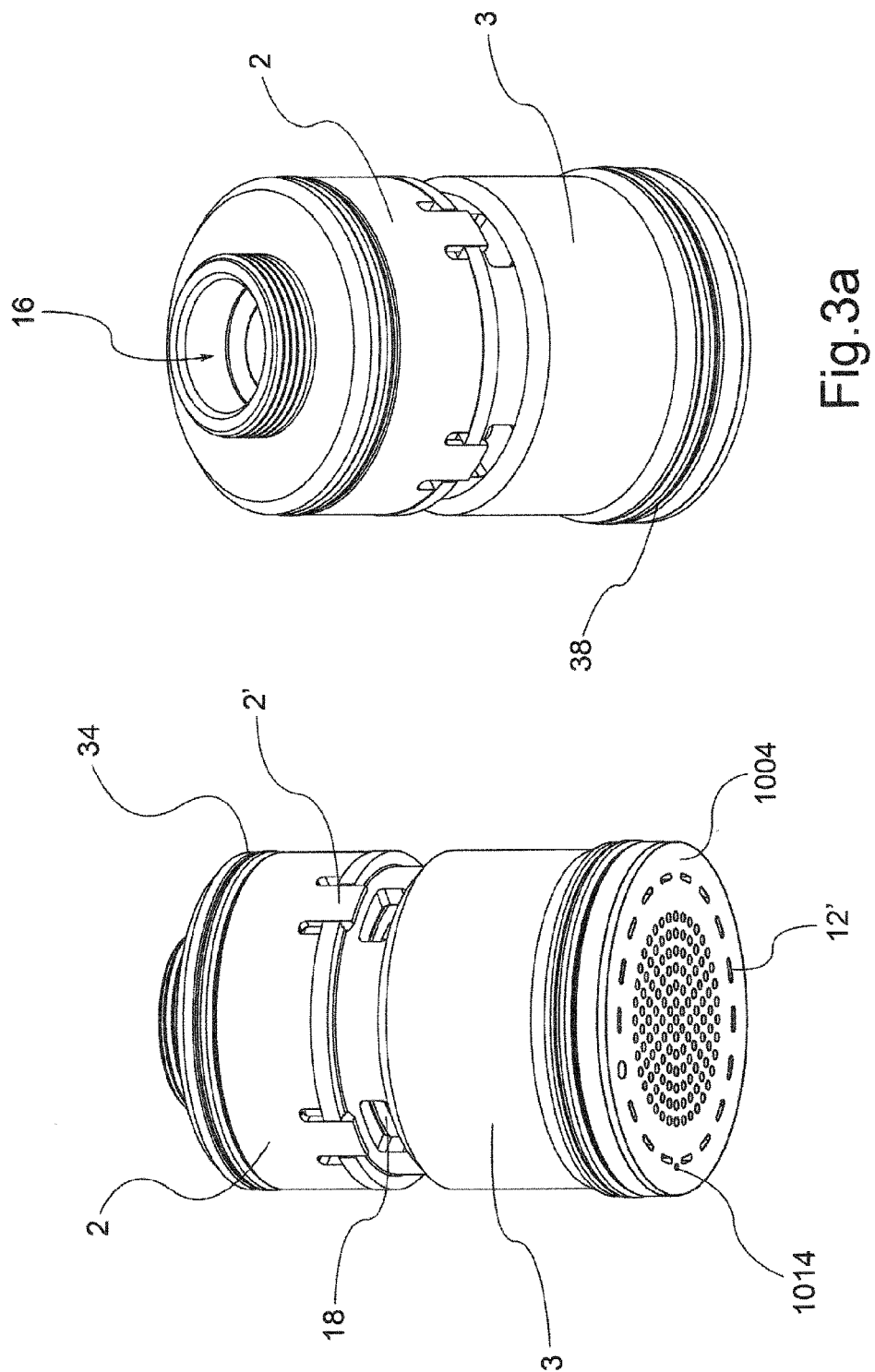
Figure 4:
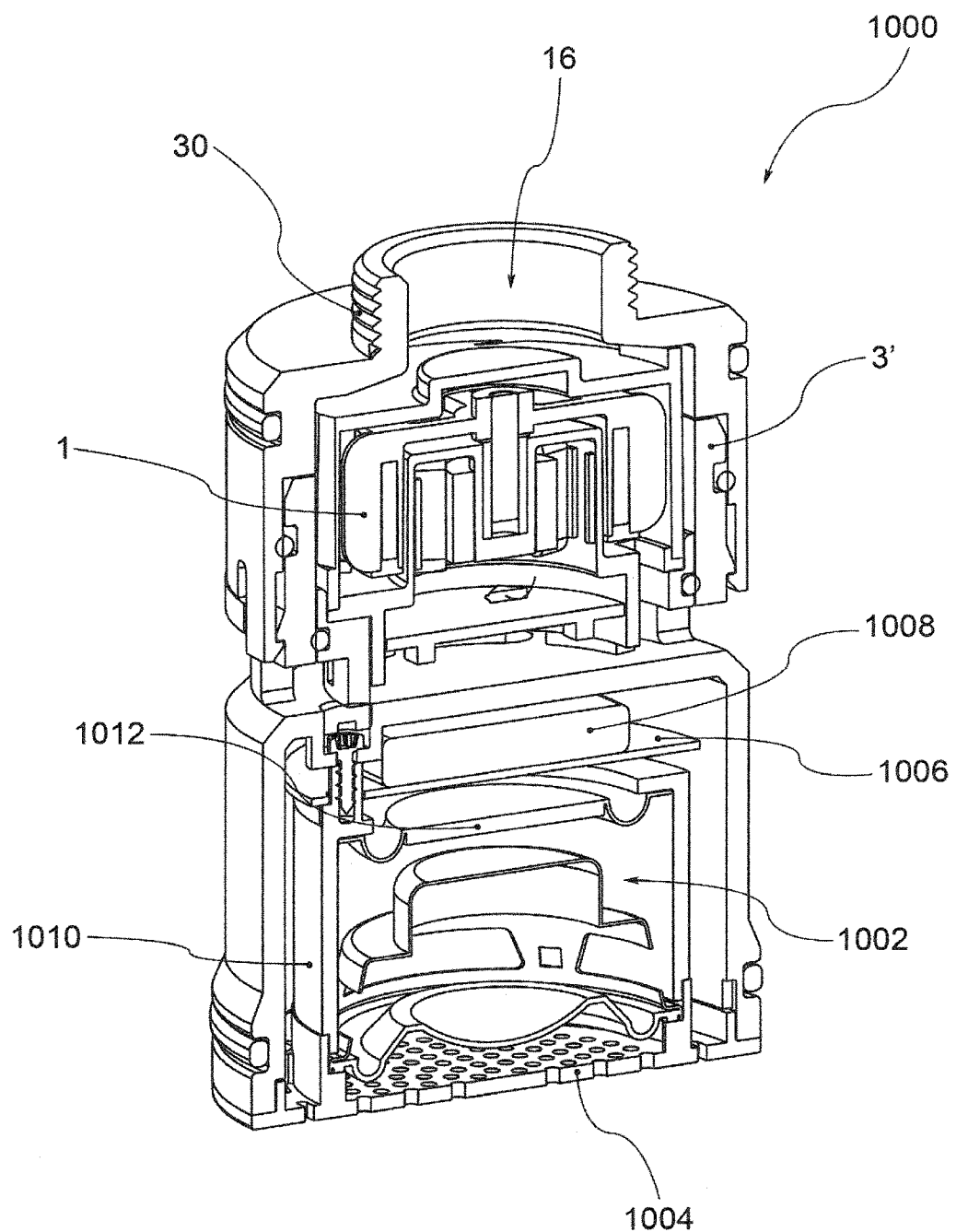

The loudspeaker cartridge 1000 shown in FIGS. 3, 3*a* and 4 differs from the cartridge for lighting effects 100 in the electronic device housed in the second compartment 22, in this case a loudspeaker 1002, and in the separation element from the external environment.

The loudspeaker 1002 may be powered electrically by the current generator 1. The second compartment 22 may communicate with the external environment through a perforated plate 1004 to permit the emission of the sound produced by the loudspeaker 1002.

In certain embodiments, in the second compartment 22 an electronic driver circuit 1006 of the loudspeaker may be housed. Said electronic circuit 1006 may be provided with a receiver or a signal receiver/transmitter, suitable for communicating with a remote control unit—not shown—using a wireless data communication protocol, for example, the "Bluetooth" protocol.

The electronic circuit 1006 may be powered by the generator, for example by means of an electric cable.

In one embodiment, a back-up battery 1008 also may be housed in the second compartment 22 for the power supply of the loudspeaker 1002 (via the circuit board 1006). The back-up battery 1008 may be mounted on the circuit board 1006. The back-up battery 1008 may be suitable for powering the loudspeaker even when the flow of water is interrupted, for example, for a predetermined period of time.

In one embodiment, the loudspeaker 1002 may be inserted in a loudspeaker casing 1010, a portion of which, for example, upper, may be formed by the membrane 1012 of the loud speaker 1002.

In another embodiment, the cartridge-speaker 1000 further includes a microphone 1014, positioned for example on the perforated plate 1004 connected to the driver circuit board 1006. Consequently, the loudspeaker cartridge 1000 also may include a phone function.

In certain embodiments, the cartridge-speaker 1000 may include one or more light signalling devices, positioned for example on the perforated plate 1004 connected to the driver circuit board 1006. Said signalling devices with LEDs, for example, may report the operating status of the cartridge.

The perforated plate 1004 may be provided with a plurality of apertures 12' suitable for being engaged by the teeth 52 of a spanner 50 used to screw/unscrew the loudspeaker cartridge 1000 to/from the dispenser device of the jet of water.

Figure 5:
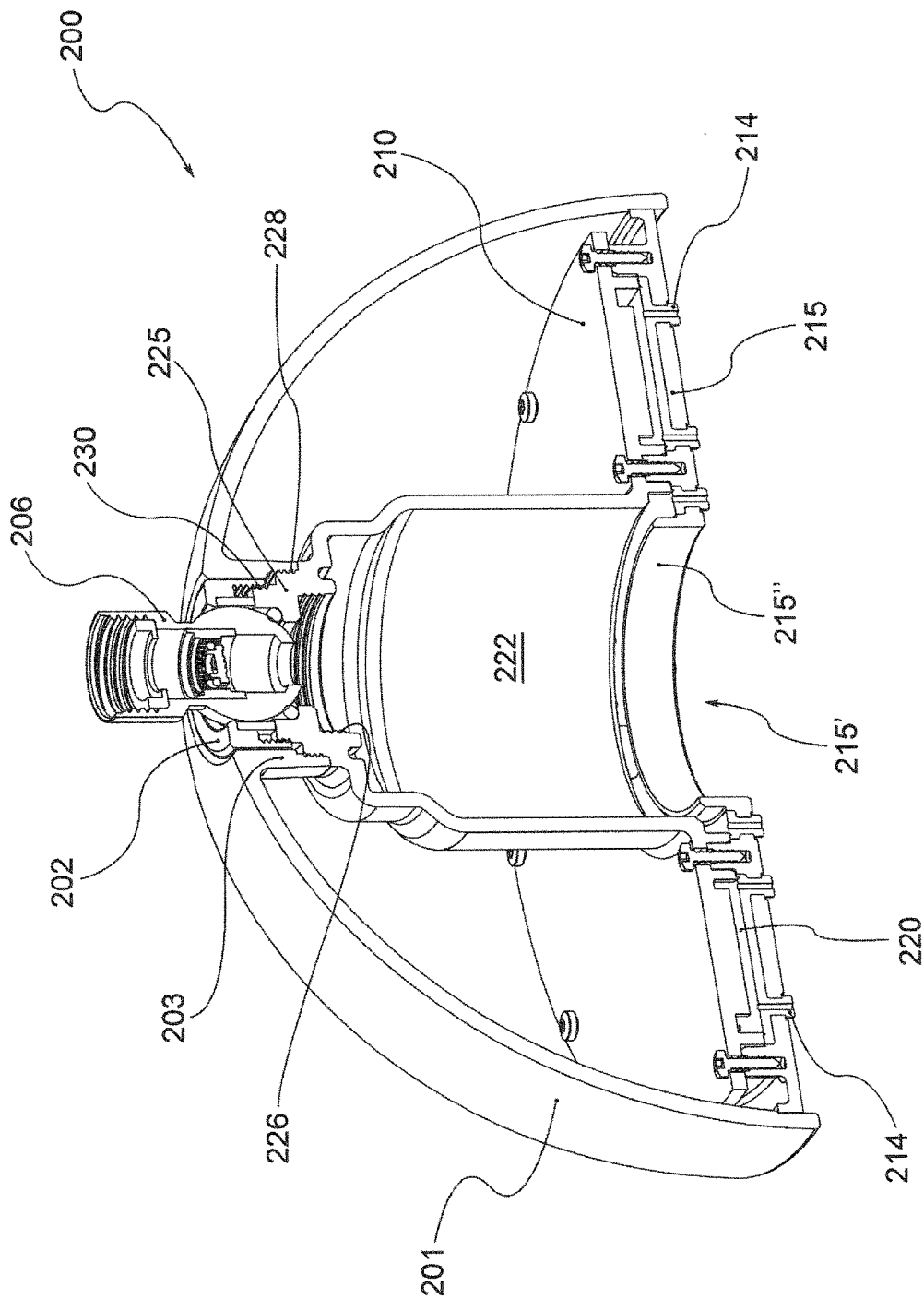
FIG. 5 is a perspective view in cross-section of a dispenser device of a jet of water suitable for receiving the cartridge according to the invention.
Figure 6:
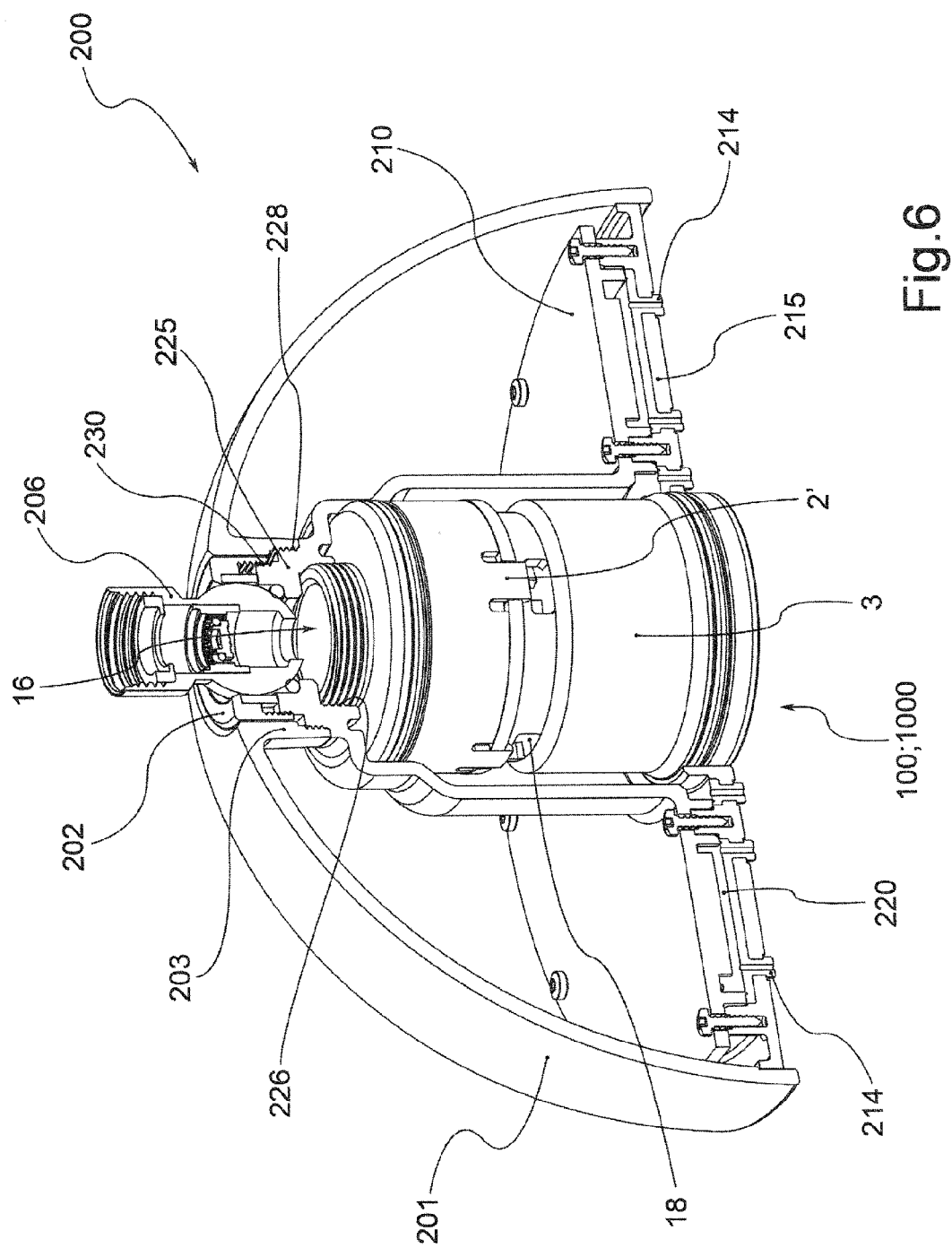
FIG. 6 shows, in partial cross-section, a dispenser device incorporating a cartridge.
Figure 7:
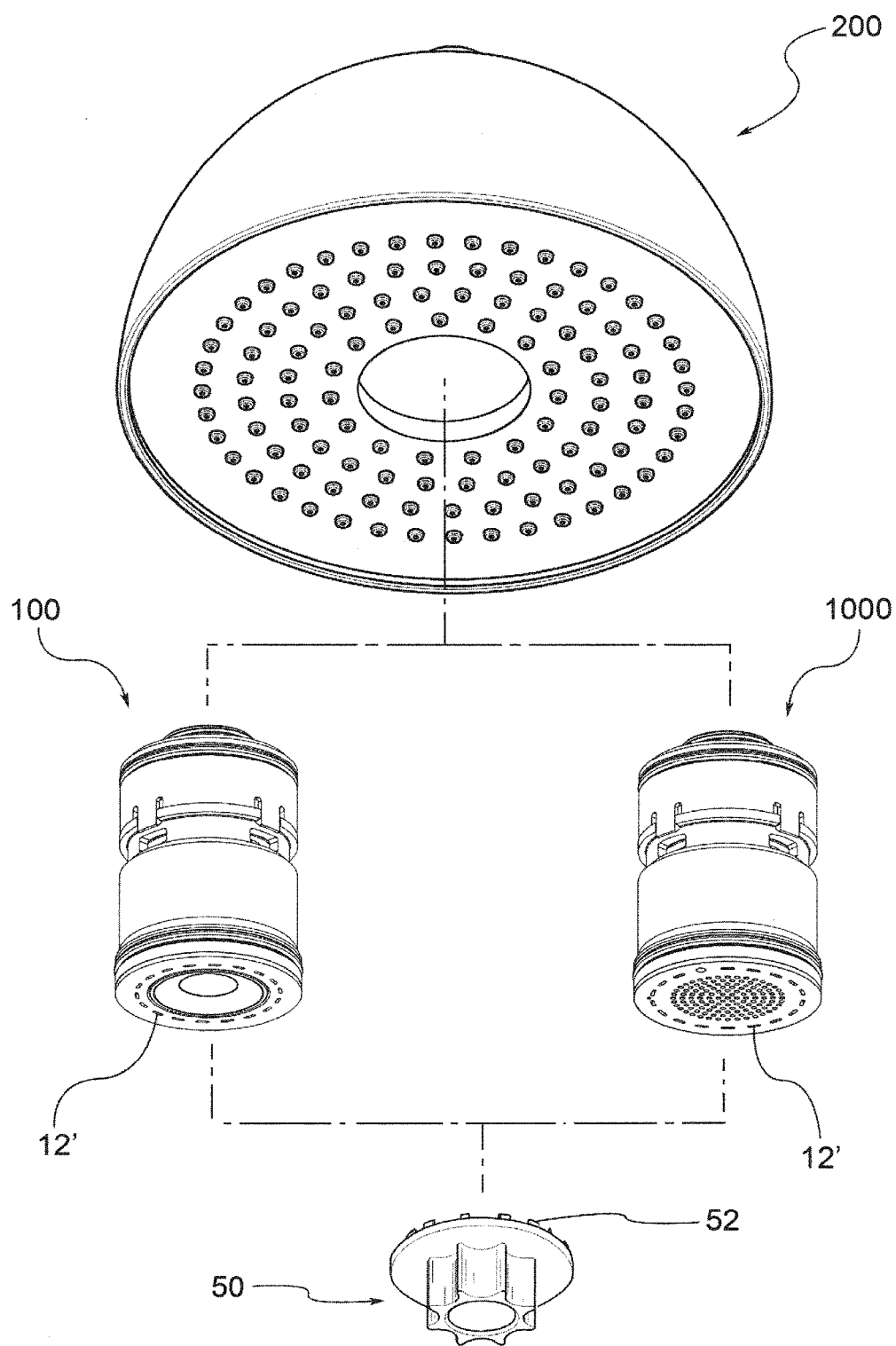
FIG. 7 is a view in separate parts of a dispenser device, of a set of two cartridges associable with the dispenser device and of a spanner for screwing the cartridges to the dispenser device.

FIGS. 5-7 show examples of use of cartridges 100 and 1000 in a dispenser device for dispensing a jet of water 200, for example, in the form of a shower head.

In a general embodiment, said dispenser device 200 includes a hydraulic connection element 206 to a water supply pipe, a device body 201, and a distribution chamber 220 of the jet of water fluidically connected to said hydraulic connection element 206. Said distribution chamber 220 may be provided with at least one dispenser nozzle 214, preferably a plurality of dispenser nozzles 214 distributed over a dispenser plate 215 which delimits the distribution chamber 220 underneath.

In certain embodiments, the hydraulic connection element 206 may be a ball joint engaged by a bushing 202 housed in a top portion of the device body 201.

A cartridge seat 222 may be present in the device body 201 open towards the hydraulic connection element 206 and in communication with the distribution chamber 220. In said cartridge seat 222 one of the cartridges 100 or 1000 described above (FIG. 6) may be housed.

In certain embodiments, said cartridge seat 222 may include a tubular casing, preferably of a shape corresponding to the shape of the cartridge body 101, for example, substantially cylindrical or cup or bell-shaped, which extends inside the device body 201 from the distribution chamber 220 to the hydraulic connection element 206. At the cartridge seat 222, the bottom of the distribution chamber 220, for example consisting of the dispenser plate 215, may have a cartridge aperture 215' engaged by the lower part of the cartridge.

The cartridge seat 222 may include a side wall 224 which acts in conjunction with a first external sealing element 34 of the cartridge, so that all the water coming from the hydraulic connection element 206 is channeled into the entry aperture 16 of the cartridge.

Downstream of the exit apertures 18, the bottom of the distribution chamber 220, formed for example of the dispenser plate 215, may sealingly engage the cartridge body 101, so that all the water coming out of the exit apertures 18 of the cartridge 100 enters the distribution chamber 220 to be ejected by the dispenser nozzles 214. For example, the cartridge aperture 215 may have a rim 215" acting in conjunction with the second external sealing element 38 of the cartridge.

In another embodiment, the lower end of the cartridge 100 or 1000 may be substantially coplanar with the dispenser plate 215.

In certain embodiments, an upper portion of the cartridge seat 222, open towards the hydraulic connection element 206, may be delimited by a top wall 225 having an internally threaded cylindrical portion 226 into which the threaded neck 30 of the cartridge 100 or 1000 screws. Therefore, to attach the cartridge 100 or 1000 to the dispenser device 200 it is sufficient to insert the cartridge 100 or 1000 from below into the cartridge seat 222 and to screw the cartridge body 101 to said threaded cylindrical portion 226.

In one embodiment, the distribution chamber 220 is delimited at the top by a distribution plate 210 which also forms, in a single body, the side wall 224 and the top wall 225 delimiting the cartridge seat 222.

In one embodiment, the top wall 225 also forms a first threaded outer surface 228 which screws to an inner annular protrusion 203 of the body 201 of the dispenser device, and a second threaded outer surface 230 onto which the locking bushing 202 of the hydraulic connection element 206 screws.

FIG. 7 shows the cartridges 100 and 1000 extracted from the dispenser device 200 and a spanner 50 suitable for engaging the bottom of the cartridge 100; 1000 to screw/unscrew the latter to/from the dispenser device 200. In one embodiment, the spanner 50 has a crown of teeth 52 suitable for engaging the apertures 12' made in the bottom cover 12.

The operation of the dispenser device with cartridge may be as follows.

The flow of water entering the dispenser device through the hydraulic connection element 206 may be channeled into the entry aperture 16 of the cartridge. The water thus enters the entry chamber and from here, through the entry passages 17 present on the turbine casing 7, into the turbine seat thereby operating it. The turbine 1 generates the current to power the electronic device housed in the second compartment 22.

The flow of water, after passing the current generator 1, may exit the cartridge 100; 1000 through the exit apertures 18, downstream of the sealing element with the cartridge seat 222. All the water then flows into the distribution chamber 220 and is dispensed as in a traditional shower head through the nozzle 214.

The advantages of the invention are evident.

In particular, the integration of a current generator operable by the flow of water and of an electronic device inside a cartridge makes it possible to optimise the overall dimensions, and thus realize a particularly compact unit for generating a secondary effect. While being provided with a turbine generator, with the advantages deriving therefrom in terms of electrical autonomy and continuity of operation, such a compact cartridge does not significantly affect the shape and dimensions of dispenser devices in which it is inserted.

Such cartridges, in addition, are easily and quickly used with any dispenser device already assembled and available for receiving it.

A person skilled in the art may make modifications and adaptations to the embodiments of dispenser devices and cartridges described herein, replacing elements with others functionally equivalent so as to satisfy contingent requirements while remaining within the sphere of protection of the following claims. Each of the characteristics described as belonging to a possible embodiment may be realised independently of the other embodiments described.

What is claimed is:

1. A cartridge to be housed in a cartridge seat made in a device body of a dispenser device for jets of water, comprising:
    a cartridge body, comprising a first compartment and a second compartment, said second compartment being separated from said first compartment by a watertight separation septum, the cartridge body comprising an entry aperture for the entry of a flow of water into the first compartment and at least one exit aperture opening toward the outside environment for the exit of the flow of water from the first compartment;
    a generator housed in said first compartment, said generator being suitable for being driven by a flow of water which crosses said first compartment from the entry aperture to the at least one exit aperture; and
    at least one electronic device housed in said second compartment suitable for generating a secondary effect perceivable by a user, said electronic device being powered electrically by the generator, the second compartment being separated from the external environment by a separation element suitable for allowing transmission of said secondary effect towards the outside environment, wherein
    the cartridge body comprises a cylindrical shape with a cartridge axis (X),
    the entry aperture and the separation element are provided at opposite ends of the cartridge body along the cartridge axis (X),
    the first compartment is superposed on the second compartment along the cartridge axis (X), and the at least one exit aperture of the water is directed radially with respect to the cartridge axis (X).

2. The cartridge of claim 1, wherein said secondary effect is selected from the group consisting of: a lighting effect, a sound effect, an olfactory effect, a massaging effect, and a treatment effect of the user with ultraviolet rays.

3. The cartridge of claim 1, wherein said electronic device comprises a light source, the second compartment being closed by an optical element suitable for allowing the emission of a light beam produced by the light source.

4. The cartridge of claim 1, wherein said electronic device comprises a loudspeaker, the second compartment communicating with the external environment through a perforated plate suitable for allowing the emission of sound produced by the loudspeaker.

5. The cartridge of claim 3, wherein an optical support element attached to the cartridge body is housed in the second compartment, a bottom cover being connected to said optical support element of an annular shape, the optical element being positioned in the axial aperture defined by said bottom cover.

6. The cartridge of claim 3, further comprising a temperature sensor suitable for detecting the temperature of the water dispensed so as to command the light source to emit beams of light with a colour dependent on the temperature of the water.

7. The cartridge of claim 3, wherein the light source comprises a plurality of LED point sources mounted on a circuit board.

8. The cartridge of claim 4, wherein a driver circuit board of the loudspeaker is housed in the second compartment, said circuit board comprising at least one signal receiver.

9. The cartridge of claim 8, wherein the driver circuit board also comprises a signal transmitter, and further comprises a microphone connected to said signal transmitter.

10. The cartridge of claim 1, wherein the current generator is inserted in a generator casing provided with entry passages for the flow of water coming from the entry aperture and exit passages in fluidic communication with the at least one exit aperture.

11. The cartridge of claim 1, wherein a back-up battery is housed in the second compartment for the power supply of the electronic device.

12. The cartridge of claim 1, wherein around a side wall of the cartridge body, between the entry aperture and the at least one exit aperture of the water, a first seat is present in which a first external sealing element is housed suitable for acting in conjunction with a wall of a cartridge seat made in the dispenser device of the jet of water.

13. The cartridge of claim 1, wherein around a side wall of the cartridge body, near the lower end of said body, a second seat is present in which a second external sealing element is housed suitable for acting in conjunction with a dispenser plate of the dispenser device of the jet of water.

14. The cartridge of claim 1, wherein in the bottom side of the separation element a plurality of apertures are made suitable for being engaged by teeth of a spanner utilisable to screw/unscrew the cartridge to/from a dispenser device of the jet of water.

15. The cartridge of claim 1, wherein the end of the cartridge body opposite the separation element is provided with connections to a support element.

16. A device for dispensing a jet of water, comprising the cartridge of claim 1, a hydraulic connection element to a water supply duct, the device body, and a dispenser chamber of the jet of water fluidically connected to said hydraulic connection element and provided with at least one dispenser nozzle wherein the cartridge seat is present in said body which communicates with said hydraulic connection element and with said dispenser chamber, said cartridge seat being suitable for housing the cartridge.

17. The dispenser device of claim 16, wherein the cartridge seat is delimited at the top by a top wall having an internally threaded cylindrical portion into which a threaded neck of the cartridge screws.

18. The dispenser device of claim 16, wherein said cartridge seat comprises a tubular casing which extends inside the device body from the distribution chamber to the hydraulic connection element, and wherein said distribution chamber is delimited underneath by a dispenser plate crossed by a plurality of dispenser nozzles, a cartridge aperture engageable by the lower part of the cartridge being present in said dispenser plate at the cartridge seat.

19. The dispenser device of claim 18, wherein said cartridge seat comprises a side wall suitable for acting in conjunction with the first external sealing element of the cartridge.

20. The dispenser device of claim 18, wherein, when the cartridge is housed in the cartridge seat, downstream of the exit apertures, the dispenser plate sealingly engages the cartridge body, so that the water flowing through the exit apertures of the cartridge enters the distribution chamber to be ejected by the dispenser nozzles.

21. The dispenser device of claim 16, wherein the distribution chamber is delimited at the top by a distribution plate which also forms, in a single body, the walls that delimit the cartridge seat.

22. A shower kit, comprising at least two cartridges and a dispenser device, each cartridge comprising the cartridge of claim 1,
the dispenser device comprising a hydraulic connection element to a water supply duct, a device body, and a dispenser chamber of the jet of water fluidically connected to said hydraulic connection element and provided with at least one dispenser nozzle wherein a cartridge seat is present in said body which communicates with said hydraulic connection element and with said dispenser chamber, said cartridge seat being suitable for housing said cartridge,
wherein said at least two cartridges have a different electronic device so as to generate a different secondary effect, and wherein said at least two cartridges have the same external interface for coupling to the dispenser device, so as to be interchangeable.

* * * * *